United States Patent
Yoshida

(10) Patent No.: US 8,972,764 B2
(45) Date of Patent: Mar. 3, 2015

(54) INFORMATION PROCESSING APPARATUS, METHOD, AND STORAGE MEDIUM

(75) Inventor: Fumiyuki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 214 days.

(21) Appl. No.: 13/487,579

(22) Filed: Jun. 4, 2012

(65) Prior Publication Data

US 2012/0324268 A1    Dec. 20, 2012

(30) Foreign Application Priority Data

Jun. 14, 2011   (JP) .................................. 2011-132448

(51) Int. Cl.
*G06F 1/24*    (2006.01)
*G06F 1/32*    (2006.01)
*G06F 17/30*   (2006.01)

(52) U.S. Cl.
CPC .......... *G06F 17/3007* (2013.01); *G06F 1/3284* (2013.01); *Y02B 60/1267* (2013.01)
USPC ............................ 713/324; 713/100; 713/320

(58) Field of Classification Search
USPC ......................................... 713/100, 320, 324
See application file for complete search history.

(56) References Cited

U.S. PATENT DOCUMENTS

| | | | |
|---|---|---|---|
| 6,243,831 B1 * | 6/2001 | Mustafa et al. | 714/24 |
| 6,694,451 B2 * | 2/2004 | Atkinson | 714/15 |
| 2003/0131206 A1 * | 7/2003 | Atkinson et al. | 711/156 |
| 2005/0268127 A1 * | 12/2005 | Shiba et al. | 713/320 |
| 2011/0040938 A1 * | 2/2011 | Jeon et al. | 711/118 |

FOREIGN PATENT DOCUMENTS

| | | |
|---|---|---|
| JP | 2004-098399 A | 4/2004 |
| JP | 2005-193652 A | 7/2005 |
| JP | 2006-192853 A | 7/2006 |
| JP | 2007-114620 A | 5/2007 |
| JP | 2007-306143 A | 11/2007 |
| JP | 2009-199189 A | 9/2009 |

* cited by examiner

*Primary Examiner* — Vincent Tran
(74) *Attorney, Agent, or Firm* — Harness, Dickey & Pierce

(57) ABSTRACT

A novel information processing apparatus maintains file system information in a secondary storage device during power saving mode. The information processing apparatus keeps storing file information and mounting information in the secondary storage device without releasing it in shutdown process 303 when it transitions to power saving mode, and uses the saved file information 401 and mounting information 402 in reinitializing process 304 when it returns from power saving mode. User program 201 does not need to execute file initializing process. Also, since mounting information 402 is kept, the information processing apparatus can access the file system in the secondary storage device immediately if the power of the secondary storage device is on and the secondary storage device is available.

9 Claims, 12 Drawing Sheets

INFORMATION PROCESSING APPARATUS, METHOD, AND STORAGE MEDIUM

CROSS-REFERENCE TO RELATED APPLICATION

This patent application is based on and claims priority pursuant to 35 U.S.C. §119 to Japanese Patent Application No. 2011-132448, filed on Jun. 14, 2011, the entire disclosure of which is hereby incorporated by reference herein.

BACKGROUND OF THE INVENTION

1. Field of the Invention

The present invention relates to an information processing apparatus, an information processing method, and a storage medium that stores a software program implementing the information processing method on a computer, and more particularly to an information processing apparatus with the ability to turn the power of a secondary storage device off in a power saving mode.

2. Description of the Related Art

Recently, information processing apparatuses such as image processing apparatuses (e.g., printers, facsimiles, and digital multi function peripherals (MFPs)) are required to be energy-efficient. They accomplish this goal in part by keeping their standby power consumption low, by stopping supplying power to parts of the apparatus.

An example of an image processing apparatus that downloads programs from a hard disk drive (HDD) to a dynamic random access memory (DRAM) in advance, cuts off the power of the HDD in transition from a normal operating mode to power saving mode, and resumes quickly rebooting programs stored in the DRAM in returning to normal mode from power saving mode is disclosed, for example, in JP-2005-193652-A.

However, the image processing apparatus described above has three problems. (1) It is expensive to equip the image forming apparatus with a DRAM that can store all the programs that are on the HDD. (2) It takes time to return to normal operation from the power saving mode since it is necessary to reboot the programs. (3) How to maintain the state of file systems shared by the whole system, such as file system mounting information in the secondary storage device, is not described. While individual programs can be booted up this way, doing so might contradict the state of the booted program since the state that is seen from the system as a whole, such as the file system mounting information, cannot be maintained.

JP-2007-306143-A discloses another example of an image processing apparatus having a power control capability. The apparatus registers callback functions provided for each device driver for each power control mode when it initializes the device drivers. Accordingly, the callback function is called using events of transitioning to and from power saving mode as triggers. State saving processes that each device driver executes in transitioning to power saving mode and saved state recovering processes that each device driver executes in returning from power saving mode are implemented in the callback functions. Accordingly, each device can maintain its state as it transitions to and from power saving mode.

However, while the image processing apparatus described in JP-2007-306143-A can maintain the state of each device, saving file system information that does not belong to a device is not considered. Also, controlling behavior inside kernel processes and that of user processes is not considered.

Concerning secondary storage devices such as USB memory devices, cutting off the power to save power consumption is regarded as ejecting the device. Although a shutdown process is executed at the time of ejection, it is necessary to distinguish whether that shutdown process was evoked by transitioning to power saving mode or by turning the power off. Hooking functions cannot execute this kind of complicated control.

BRIEF SUMMARY OF THE INVENTION

The present invention provides a novel information processing apparatus, method, and storage medium that turn the power of secondary storage device off in power saving mode and can keep holding file system information in the secondary storage device in power saving mode.

The present invention provides an information processing apparatus that has a main storage device and a secondary storage device, and includes a storage area allocation unit that allocates storage area to store file system information of the secondary storage device in the main storage device, an information writing unit that writes the file system information to the allocated storage area, an information keeping unit that keeps the file system information during power saving mode, and a power control unit that turns the power of the secondary storage device off during power saving mode.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1:
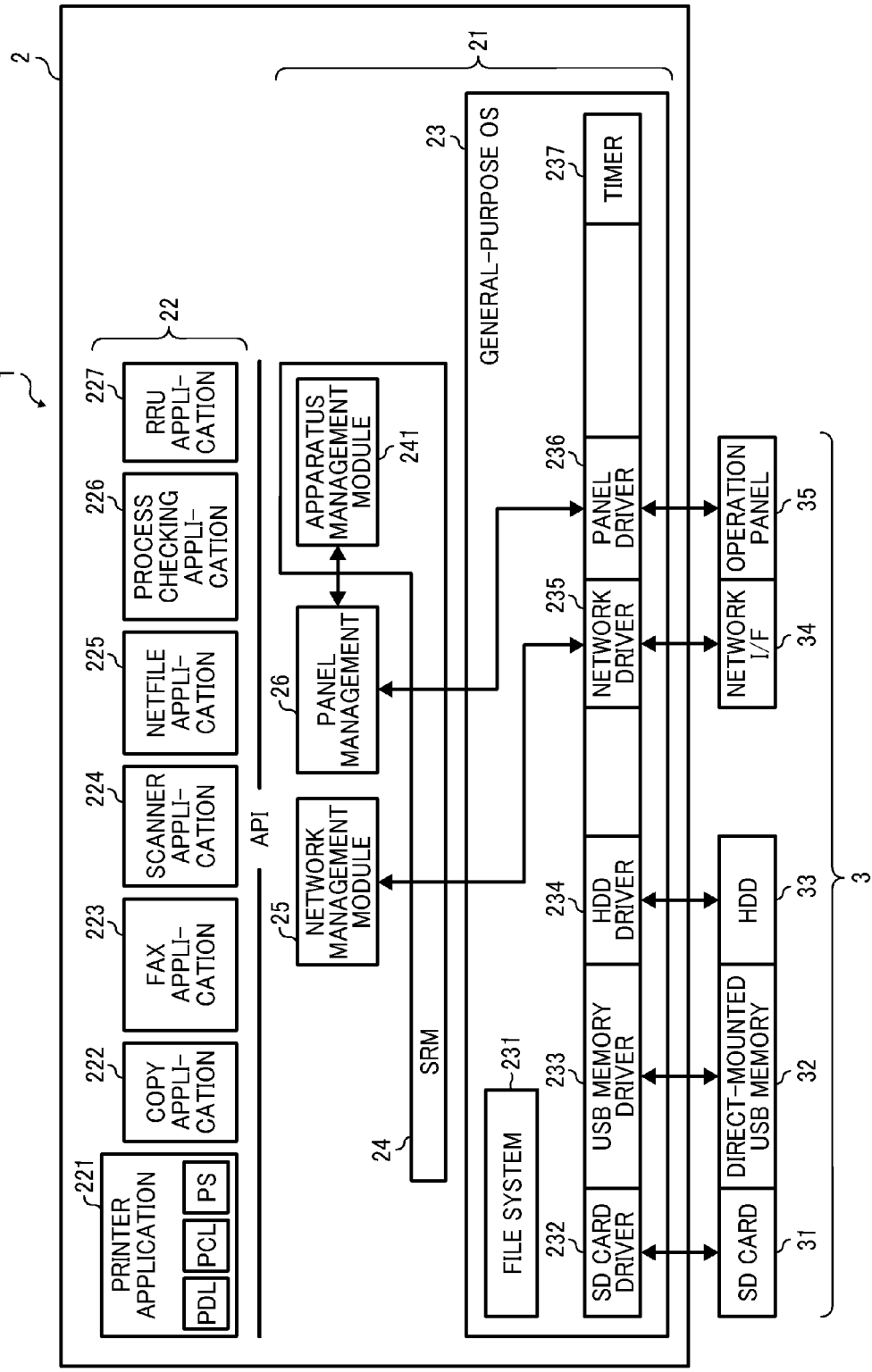
FIG. 1 is a block diagram illustrating a software configuration of an information processing apparatus of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention is described in detail below with reference to the drawings.

FIG. 1 is a block diagram mainly illustrating a software configuration of an information processing apparatus of the present invention. An information processing apparatus 1 is a digital MFP, and includes a main unit 2 that includes various software and attached devices either built-in or externally connected to the main unit 2. The main unit 2 includes a controller that has a Central Processing Unit (CPU), RAM (main storage device), and Read Only Memory (ROM), as in a general-purpose computer.

Software included in the main unit 2 consists of a platform 21 and one or more applications 22. The platform 21 consists of a general-purpose Operating System (OS) 23, a System Resource Manager (SRM) 24, a network management module 25, and a panel management module 26.

Examples of the general-purpose OS 23 are UNIX and Linux. The general-purpose OS 23 executes the platform 21 and the application 22 as processes concurrently.

The general-purpose OS 23 includes a file system 231. The general-purpose OS 23 also includes various drivers, including a SD card driver 232, a USB memory driver 233, a HDD driver 234, a network driver 235, and a panel driver 236. Devices corresponding to each driver, such as a SD card 31, a direct-mounted USB memory 32, a HDD 33, a network interface (I/F) 34, and a control panel 35, are connected to each driver. The general-purpose OS 23 also includes a timer 237.

The application 22 includes a printer application 221 for printers implementing Page Description Language (PDL), Printer Control Language (PCL), and Postscript (PS), a copy application 222, a facsimile application 223, a scanner application 224, a net file application 225, a process checking application 226, and a Remote ROM Update (RRU) application 227 to update ROM remotely.

The network management module 25 and the panel management module 26 are control modules that interpret processing requests from the application 22 and generate hardware resource acquisition requests.

That is, the network management module 25 is a group of modules that deliver services usable commonly to applications that need the network I/F 34, distribute data received from the network to each application using each protocol, and go between the application and the network when the application sends data to the network. Specifically, the network management module 25 includes server daemons such as ftpd, httpd, lpd, snmpd, telnetd, and smtpd and client functions for same protocol and so on.

The panel management module 26 controls the control panel 35 that conveys information between an operator and the main unit 2, and executes processes such as reporting key operating events by the operator to the main unit 2, delivering library functions for application to build Graphical User Interface (GUI), managing built GUI information for each application, and reflecting display on the control panel 35.

The SRM 24 manages one or more hardware resources, and arbitrates acquisition requests from control modules. That is, the SRM 24 and an apparatus management module 241 control the system, manage resources, arbitrate requests from upper layer that uses hardware resources such as an engine like a scanner unit and a printer unit (not shown in figures), the SD card 31, the direct-mounted USB memory 32, the HDD 33 as a secondary storage device, the network I/F 34 and the control panel 35, and control executing.

The apparatus management module 241 executes processes such as (1) managing the applications, (2) controlling the control panel, (3) displaying system screens (job list screen, counter displaying screen and so on), (4) displaying LED, (5) managing resources, and (6) controlling interrupting applications.

Particularly, in (1) managing the applications, the apparatus management module 241 registers an application and notifies other applications of that information. The apparatus management module 241 notifies the registered application of engine state in response to system settings and settings on requests from the application. Also, the apparatus management module 241 queries on transition to power saving mode and recovery from power saving mode, and asks for or against to system transition state such as interrupt modes to registered application.

In (2) controlling the control panel, the apparatus management module 241 exercises exclusive control of an application having the right to use the control panel, and exclusive notification of the application have right of control panel use of key information from the panel management module 26. This key information is masking control that stops notification temporarily in response to transition state of the system such as during application switching, etc.

In (3) displaying system screens, the apparatus management module 241 displays warning screen corresponding to engine state in response to requests from application that has the right to use the control panel. One example of such controlling displaying is switching displaying warning screen on/off. Other examples are displaying job list screen to display reserving/executing state of jobs, displaying counter screen to display total counter etc., and displaying under notification to the panel management module 26. The apparatus management module 241 displays these system screens that cover application screen instead of requesting the application to release its right to use the control panel.

In (4) displaying LED, the apparatus management module 241 controls displaying system LEDs such as application keys and warning LEDs. Regarding application-specific LEDs, the application controls them directly using the displaying driver.

In (5) managing resources, the apparatus management module 241 provides services for exclusive control of engine resources (such as scanner and stapling) needed to be excluded in executing jobs for engine control module (not shown in figures.)

In (6) controlling interrupting applications, the apparatus management module 241 provides controlling and servicing to run specific applications preferentially.

Next, how the information processing apparatus 1 executes information processing of the file system in power saving mode is described below referring to FIG. 2 and FIG. 3.

Figure 2:
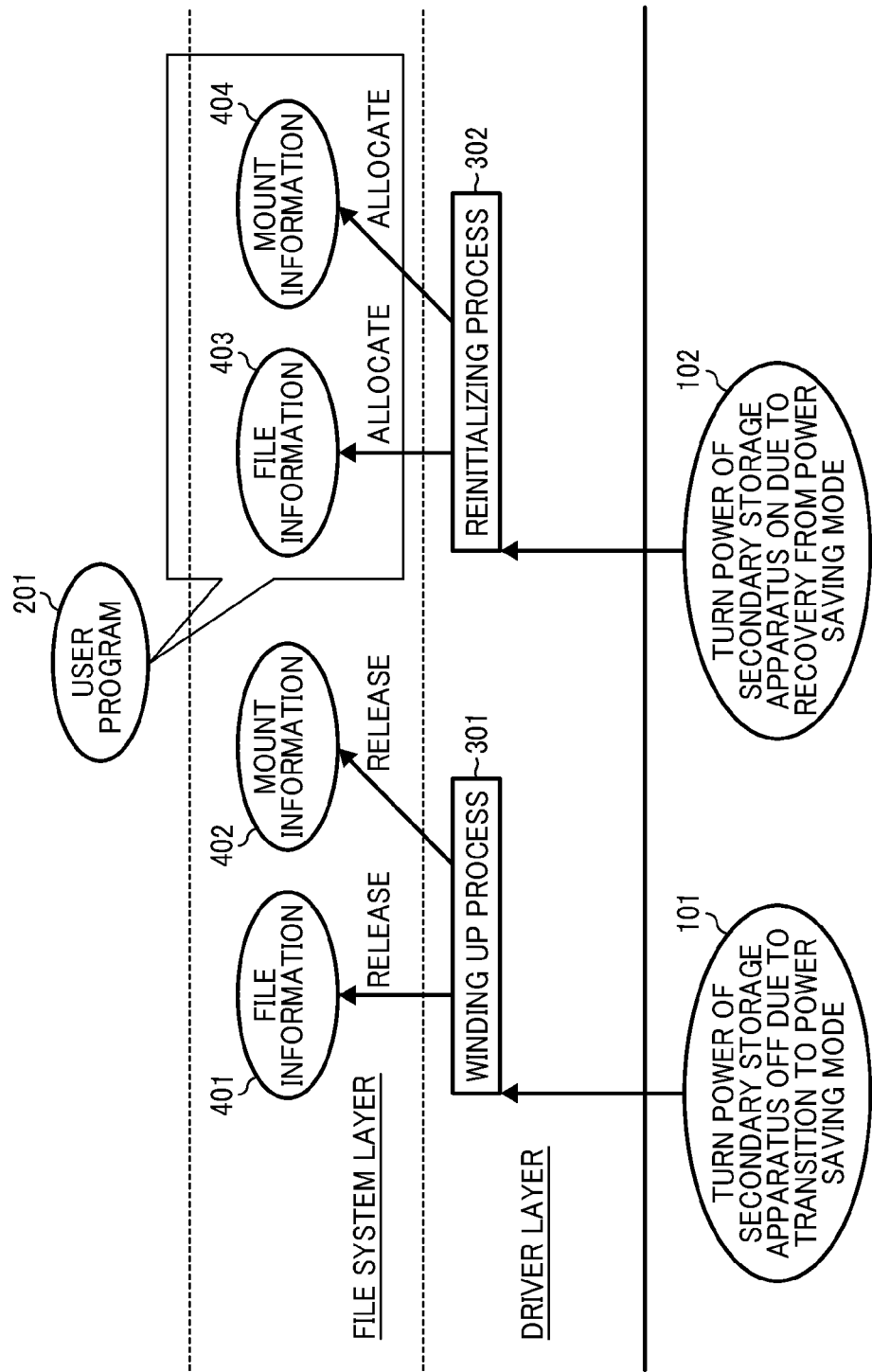
FIG. 2 is a diagram illustrating possible information processing of file system in power saving controlling of the information processing apparatus of the present invention.

Generally speaking, regarding information processing apparatuses that use general-purpose OS as shown in FIG. 1, turning the power of a secondary storage device off (e.g. direct-mounted USB memory 32) (power off event 101) uses a shutdown process 301 in driver layer (e.g., the USB memory driver 233) as a trigger as shown in FIG. 2. Then the file system layer (the file system 231) releases memory area in RAM that stores the file information 401 and the mounting information 402 as file system information of the secondary storage device, and discards that information.

Therefore, after returning from power saving mode and powering on the secondary storage device (power on event 102), that evokes reinitializing process 302 in driver layer, and file system layer creates file information 403 and mounting information 404 for the secondary storage device, and writes that information to memory area allocated in RAM.

This causes two problems for the user process. (1) File information that a user program 201 holds is erased. Therefore, regarding user processes running on UNIX-like OS, the file must be opened again to access the file that was opened before transitioning to power saving mode. (2) The whole system shares mounting information. This makes the file system of the secondary storage device visible from specific path. This information must also be reallocated. The file system in the secondary storage device is not accessible until this reallocating process finishes, so functions that use files in the secondary storage device are not available until then.

Figure 3:
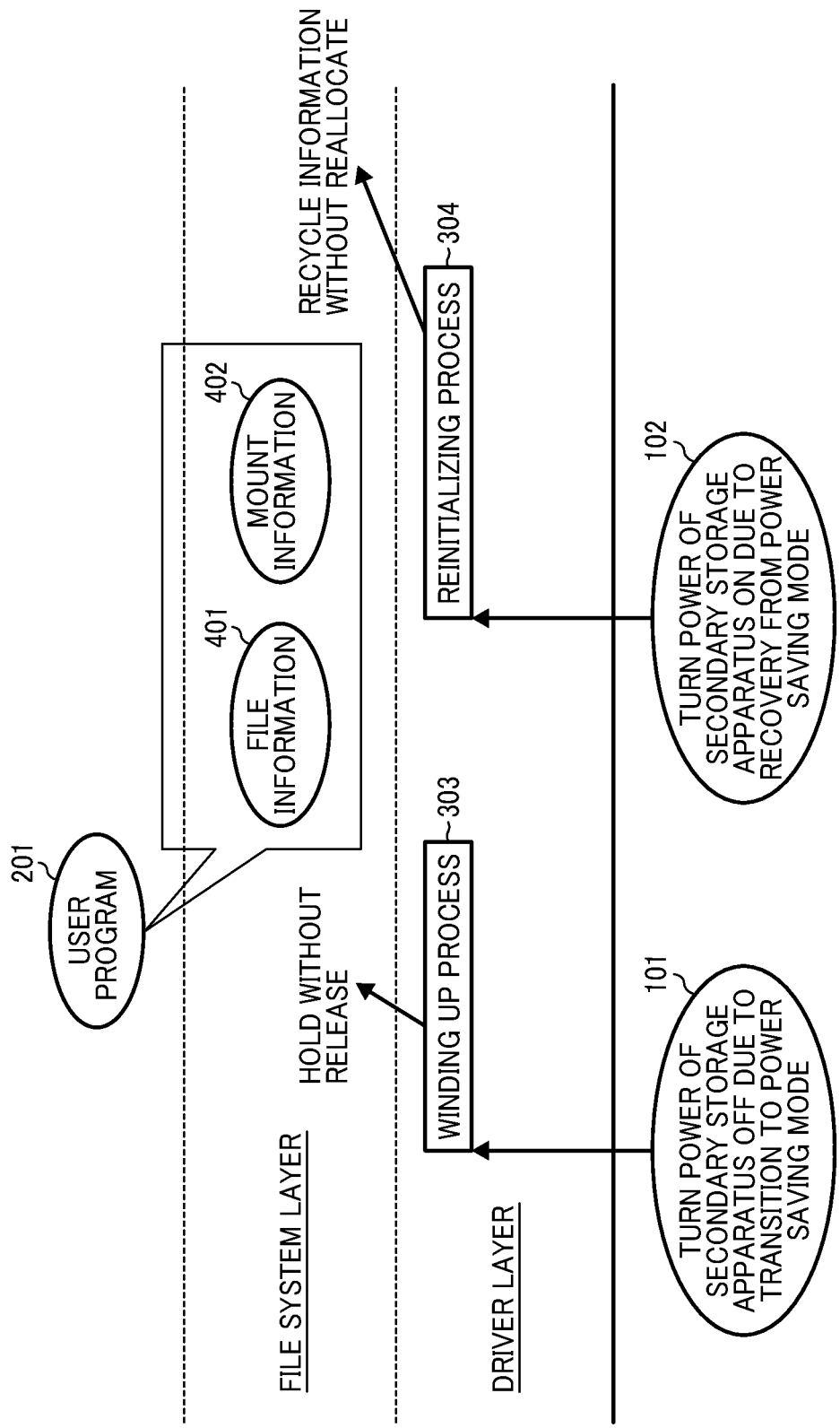
FIG. 3 is a diagram illustrating information processing of file system in power saving controlling of the information processing apparatus of the present invention.

To resolve this issue, the file information 401 and the mounting information 402 are not released (discarded) but kept holding in the shutdown process 303 in transitioning to power saving mode as shown in FIG. 3 in this embodiment. At returning from power saving mode, reallocating in the reinitializing process 304 is not executed, and the kept file information 401 and mounting information 402 are used as is.

Accordingly, there is no need to execute redundant initializing process for files at the user process side. Also, after powering on the secondary storage device and the hardware is ready to use, the file system in the secondary storage device is instantly accessible since the mounting information 402 is kept. Therefore, the user does not have to wait since the user can use functions that use files in the secondary storage device immediately.

There is one more thing that needs to be considered to implement process shown in FIG. 3, and that is in some sense a contradictory state in which, even though the secondary storage device is turned off hardware-wise, the file system in the secondary storage device looks accessible software-wise.

There are two types in programs that access files: User programs and fixed cycle cache writing back process. User program runs on OS, and goes through Application Programming Interface (API) provided by the OS when it accesses a file. Fixed cycle cache writing back process is a special program that reflects content of file cache that OS keeps to the secondary storage device, and it runs as a part of the OS.

Figure 4:
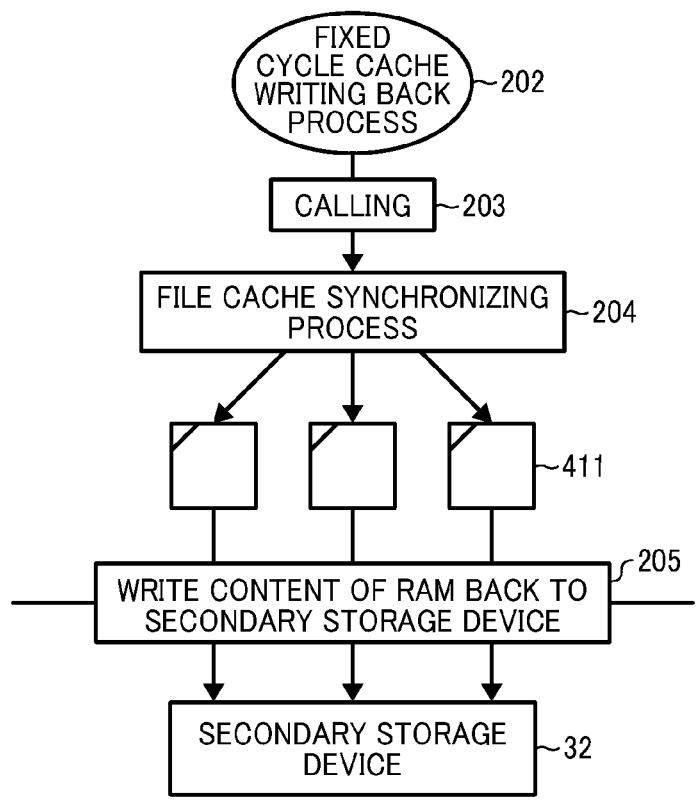
FIG. 4 is a diagram illustrating writing back processing of fixed cycle cache of the information processing apparatus of the present invention.

The fixed cycle cache writing back process is described referring to FIG. 4. In a fixed cycle cache writing back process 202, a calling process 203 calls a file cache synchronizing process 204, and the file cache synchronizing process 204 executes a writing back process 205 that writes the file cache 411 on RAM in the main unit 2 back to the secondary storage device (direct-mounted USB memory) 32.

The general-purpose OS 23 has a mechanism that keeps data on secondary storage device accessed by user program recently. Accordingly, the user program does not need to access low-speed secondary storage device every time, and that contributes to performance improvement.

While there is no problem in case access by user program is just reading, executing writing can be a problem since a general-purpose OS works as following. (1) If RAM cache exists, the OS modifies the file cache and marks "dirty (discrepancy between file cache and secondary storage device.)" (2) If RAM cache does not exist, the OS creates the file cache after reading from the secondary storage device, and modifies the file cache and marks "dirty" as described in (1).

The problem is that data is erased after turning the power off if data on file cache is not reflected on the secondary storage device. To resolve that issue, there is a mechanism that reflects data on file cache to the secondary storage device periodically at a fixed cycle. The fixed cycle cache writing back process executes this process.

Figure 5:
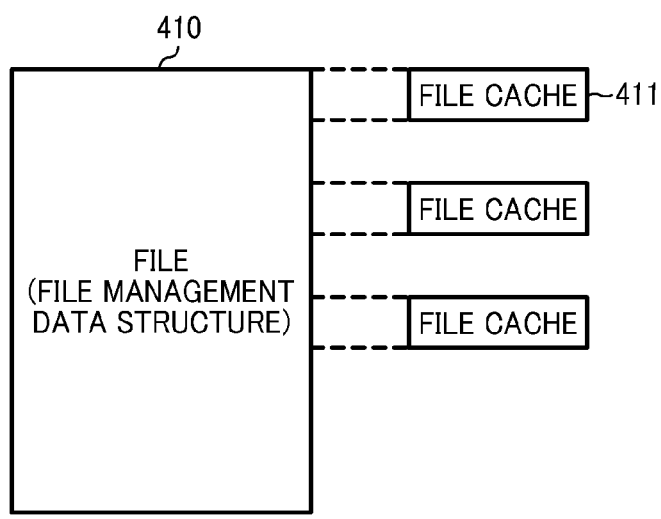
FIG. 5 is a diagram illustrating outline of a file cache of the information processing apparatus of the present invention.

FIG. 5 illustrates schematically a file cache. A data structure 410 that manages files holds a file cache 411 corresponding to a file in a list or an array structure. One file has none, one, or more file caches 411. The file cache 411 is held in block unit located at the point accessed most recently. The file cache 411 can be tracked from the data structure 410 that manages files since the data structure 410 holds the file cache 411 in a list or an array format. Therefore, files can be written back by executing file cache synchronizing process using the data structure 410 that manages files by tracking all opened files.

Figure 6:
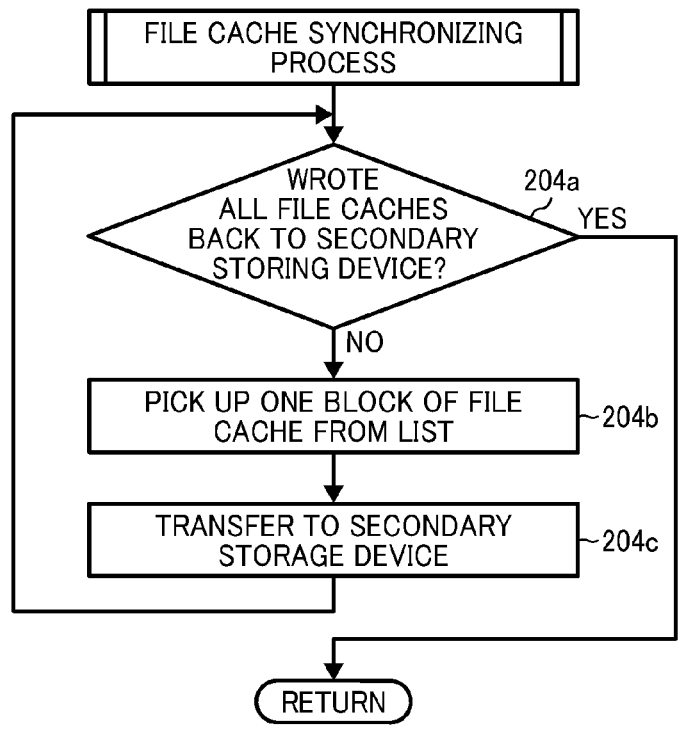
FIG. 6 is a flowchart illustrating a synchronizing process for the file cache of the information processing apparatus of the present invention.

FIG. 6 illustrates steps in the file cache synchronizing process (S204 in FIG. 4.) In the file cache synchronizing process 204, a process that picks up a block in file cache one by one (S204b) and transfers to the secondary storage device (S204c) is repeated until all of the file cache is written back to the secondary storage device (S204a:Yes.)

Figure 7:
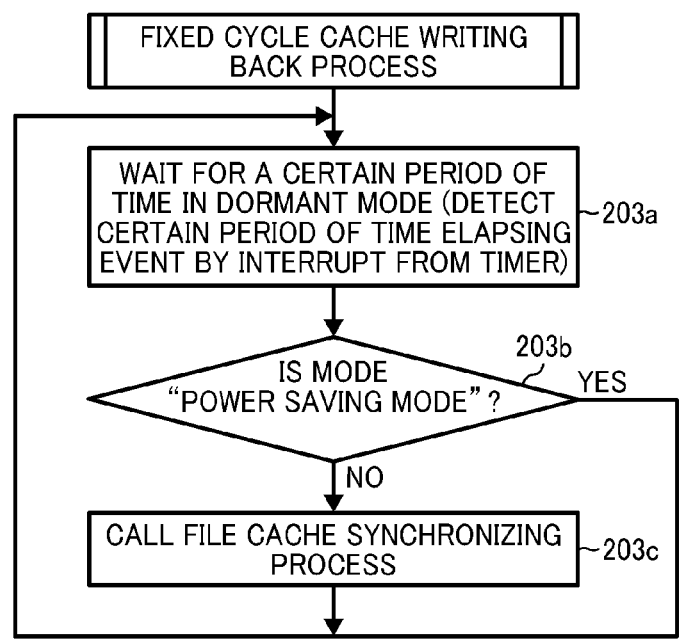
FIG. 7 is a flowchart illustrating a content of calling process in writing back process for the fixed cycle cache of the information processing apparatus of the present invention.

FIG. 7 illustrates an outline of steps in the calling process (S203 in FIG. 4) of the fixed cycle cache writing back process. First, the process waits for interruption from the timer 237 in a sleep mode for a certain period of time (S203a.) After a certain period of time, the process determines whether or not power control mode is "power saving mode" (S203b.) "Power saving mode" means it is under power saving mode. If the power control mode is not "power saving mode" (S203b:No), file cache synchronizing process is called (S203c.) If so, it returns to sleep mode for a certain period of time (S203a.)

Figure 8:
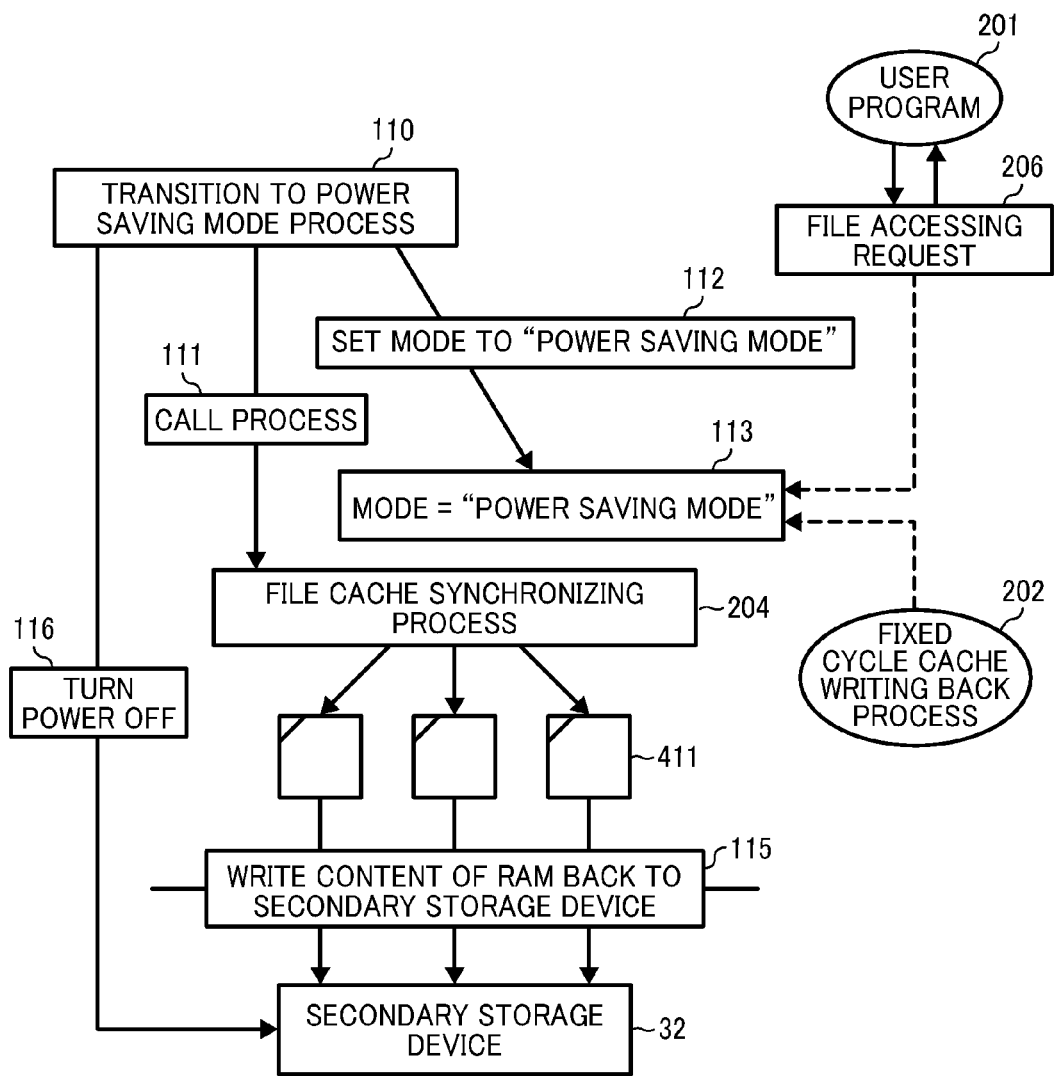
FIG. 8 is a diagram illustrating behavior in transition to power saving mode from the view point of the file system of the information processing apparatus of the present invention.

FIG. 8 illustrates behavior in power saving mode from the view point of the file system 231. There are two programs that access files, the user program 201 and the fixed cycle cache writing back process 202.

If the user program tries to access a file (file accessing request 206), the general-purpose OS 23 returns an error, since an actual device (secondary storage device) is not accessible due to power off in power saving mode. The fixed cycle cache writing back process 202 does not work in power saving mode, as shown in FIG. 7.

As shown in FIG. 8, after starting the power saving transitioning process 110, the file cache synchronizing process 204 calling process 111 (same process as 203c in FIG. 7) is executed before turning the power of the secondary storage device 32 off process 116, and all dirty data in the file cache 411 on RAM is written back to the secondary storage device 32 (P115.) The power control mode is set to "power saving mode" concurrently (P112), and the power control mode becomes "power saving mode" at the same time of turning the power off 116 (P113). Therefore, not executing the fixed cycle cache writing back process 202 does not cause a problem since data that has been written by the user program 201 is kept even after turning the power of the secondary storage device 32 off.

The power saving mode transitioning process 110 is executed in the event that there is no inputting operation from the control panel 35 for a certain period of time and there is no input of printing command from the network I/F 34 for a certain period of time. Also the power saving mode transitioning process 110 is executed by pressing a certain key (e.g. sub power key) on the control panel 35.

In booting up of the information processing apparatus 1, the apparatus management module 241 mounts file system in the secondary storage device as written in the configuration file so that all modules in the main unit 2 can access the file system in the secondary storage device 32.

Figure 9:
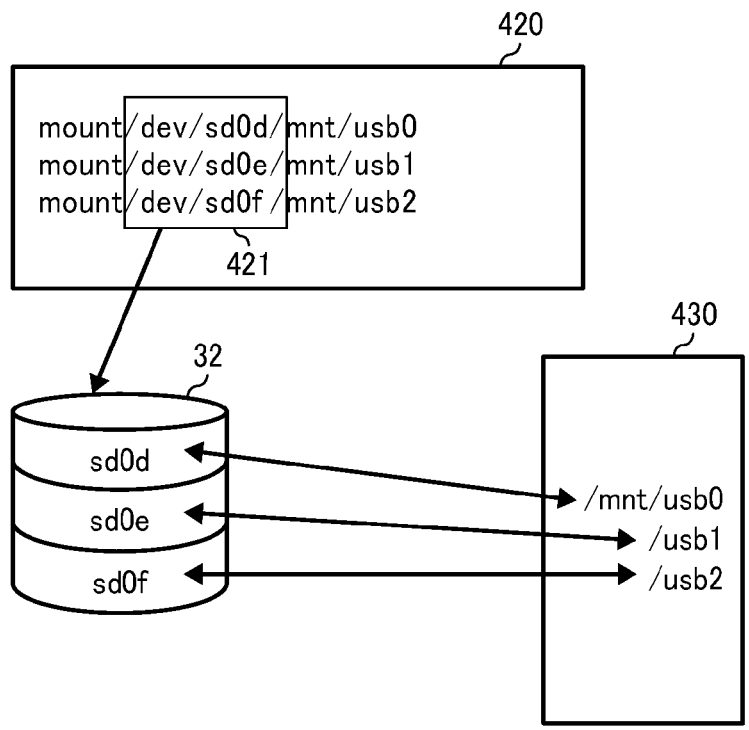
FIG. 9 is a diagram illustrating a relationship between configuration file referenced at boot up and mounting information of the information processing apparatus of the present invention.

FIG. 9 illustrates a relationship between an example of a configuration file referenced during booting up of the information processing apparatus 1 and mounting information in frame 421 corresponding to partitions (sd0*d*, sd0*e*, sd0*f*) in the secondary storage device 32.

Directory of root file system 430 expanded on RAM in the main unit 2 is associated with the file system in partition of the secondary storage device 32 by the mounting process. Accordingly, a user can access the file system in the secondary storage device 32 via the directory in the main unit 2. It should be noted that the mounting process is executed not only during booting up but also when the secondary storage device 32 is inserted into an interface of the main unit 2. That is, the mounting process is executed when the main unit 2 detects connection (electrical connection) of the secondary storage device 32.

Figure 10:
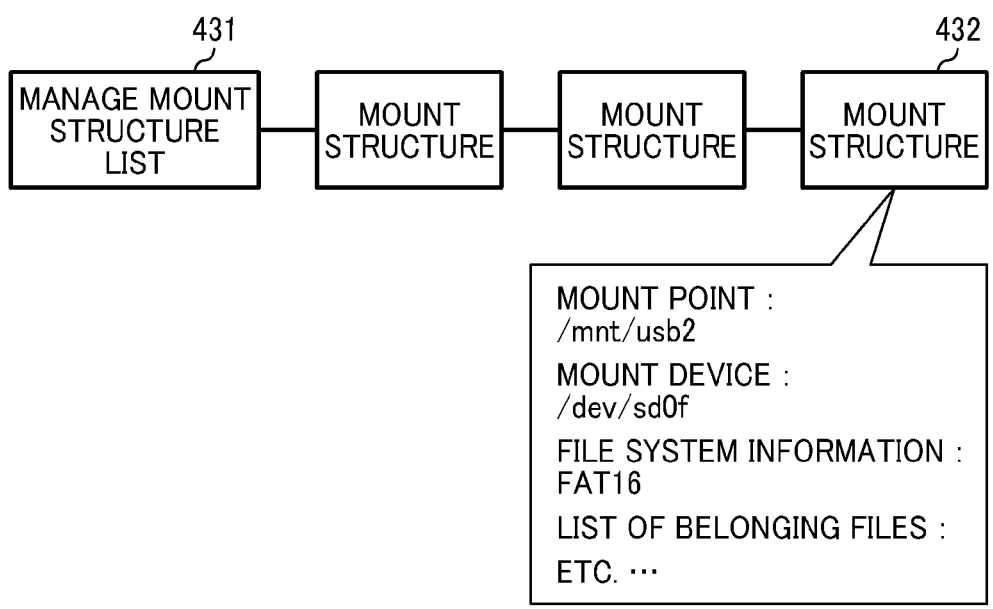
FIG. 10 is a diagram illustrating data added at the time of mounting and its data structure of the information processing apparatus of the present invention.

After the mounting process, the general-purpose OS 23 generates a mounting structure 432 that has a data structure like that shown in FIG. 10 inside the general-purpose OS 23. The mounting structure 432 is managed by a mounting structure list management table 431, and one mounting structure 432 is inserted into the list for each mounting process (during booting up and when the secondary storage device 32 is inserted.)

The mounting structure 432 has data related to mounting such as "mounting point", "mount device", "file system type", and "list of belonging files." Information on file is added to the "list of belonging files" each time the file in the corresponding file system is opened.

Figure 11:
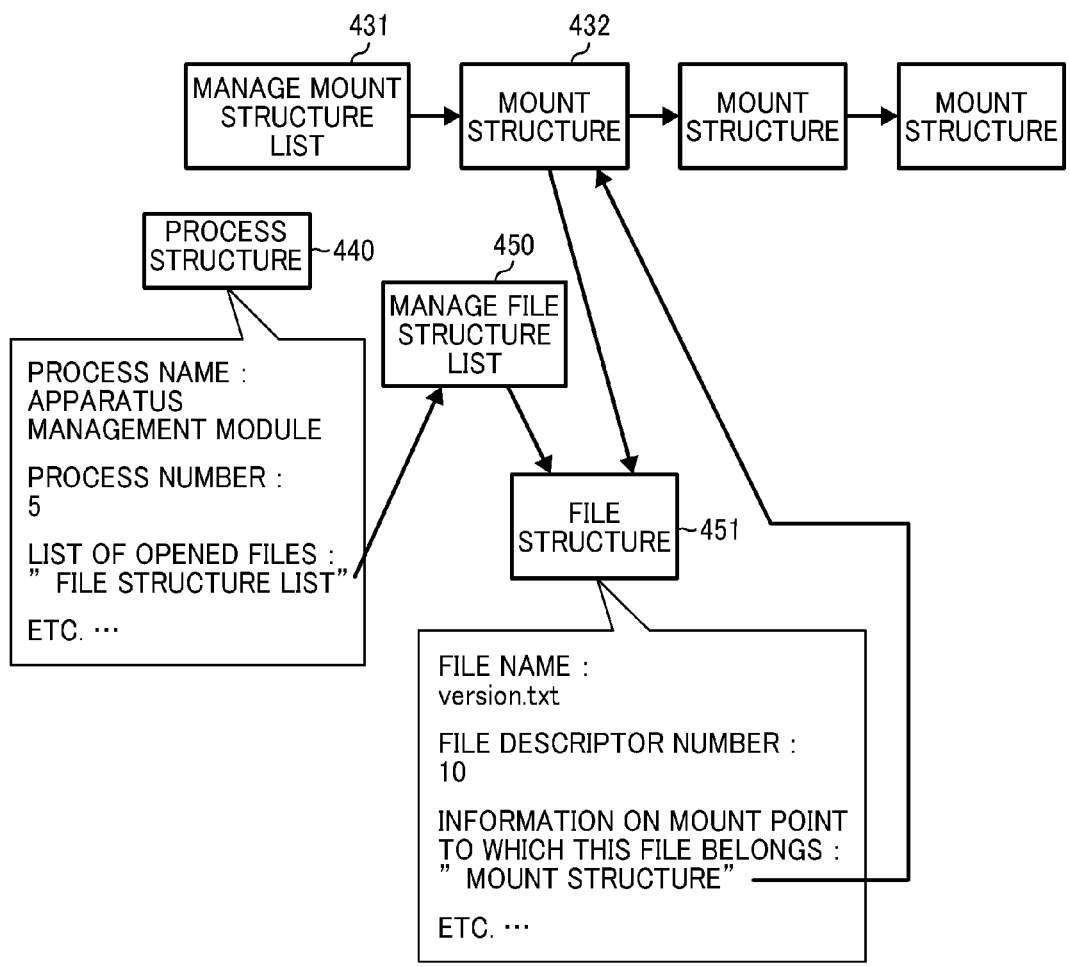
FIG. 11 is a diagram illustrating data added at the time of opening file and its data structure of the information processing apparatus of the present invention.

After generating the mounting structure 432 in FIG. 10, the information processing apparatus 1 starts operating and executes an opening process so that an arbitrary module (application) in the main unit 2 can access files in the secondary storage device. FIG. 11 illustrates data added at opening files and its structure.

In FIG. 11, a process structure 440 is a structure to manage process that opened files and has data such as "process name", "process number", and "list of opened files."

A file structure list management table 450 manages a file structure 451. The file structure 451 stores information on opened files such as "file name", "file descriptor number", and "information on mounting point to which this file belongs." The mounting structure 432 is added to "information on mounting point to which this file belongs."

FIG. 11 illustrates that the apparatus management module 241 opens a file structure list management table 450 that belongs to mounting point stored in the mounting structure 432.

Figure 12:
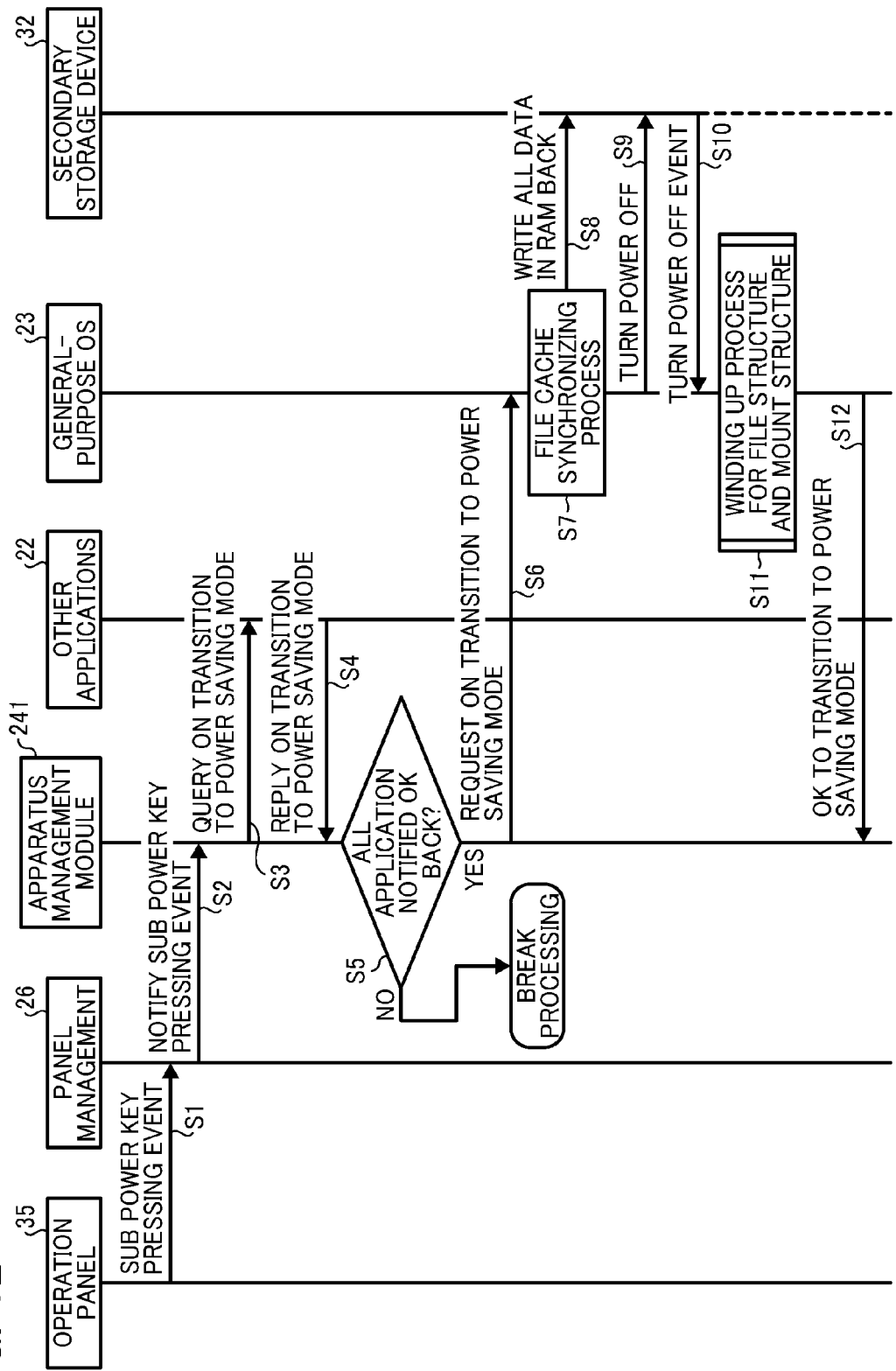
FIG. 12 is a diagram illustrating processing sequence in transition to power saving mode of the information processing apparatus of the present invention.
Figure 13:
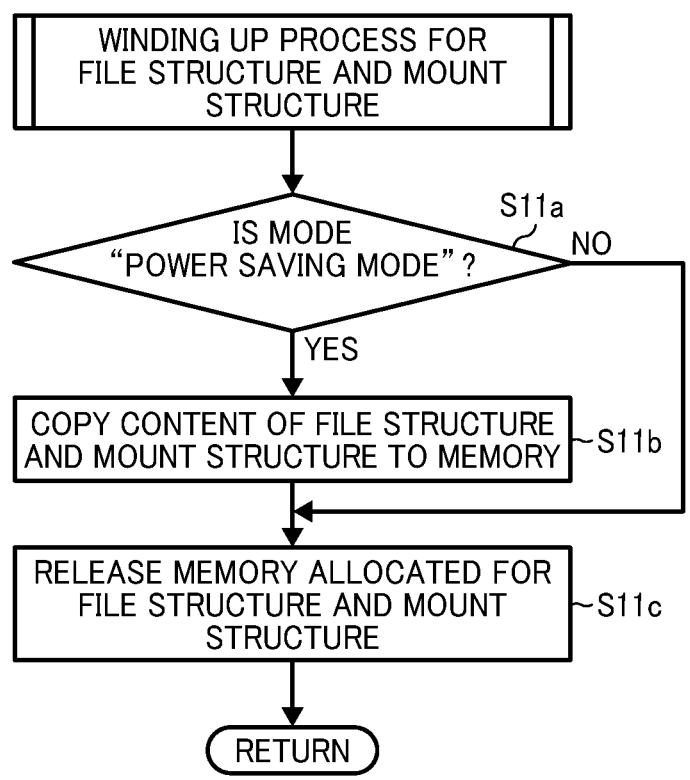
FIG. 13 is a flowchart illustrating the shutdown process in FIG. 12 of the information processing apparatus of the present invention.

Processing sequence in transition to power saving mode in the information processing apparatus 1 will be described below referring to FIG. 12 and FIG. 13. FIG. 12 illustrates processing sequence in transition to power saving mode, and FIG. 13 is a flow chart illustrating the shutdown process shown in FIG. 12.

As shown in FIG. 12, when a user presses a sub power key on the control panel 35, the control panel notifies the panel management module 25 of sub power key pressing event (S1), and the panel management module 26 notifies the apparatus management module 241 of the sub power key pressing event (S2).

Next, the apparatus management module 241 asks other applications 22 whether or not it is OK for each of them to transition to power saving mode using interprocess communication (S3), and receives response from them (S4).

The apparatus management module 241 requests to transition to power saving mode only if all the applications answered OK to the transition (S5: Yes) using a system call that the general-purpose OS 23 publishes (S6). Besides (S5: No), the apparatus management module 241 quits processing.

After receiving the request to transition to power saving mode, the general-purpose OS 23 executes file cache synchronizing process (S7), and writes file cache on RAM back to the secondary storage device 32 (S8). The flow of this file cache synchronizing process is as shown in FIG. 6.

Next, the general-purpose OS 23 turns the power of the secondary storage device 32 off by processes such as updating prescribed register values in the secondary storage device 32 (S9). When the secondary storage device 32 notifies the general-purpose OS 23 of the power off event (S10), the general-purpose OS 23 executes shutdown process for file structure and mounting structure (S11). It should be noted that sequences S9 and S10 can be executed based on communication using interrupting or communication protocol.

The general-purpose OS 23 determines whether or not it is currently under power saving mode in this shutdown process as shown in FIG. 13 (S11*a*). In this case, the general-purpose OS 23 always determines "Yes." In S11*b*, the general-purpose OS 23 copies the file structure and mounting structure to memory (storage area on RAM), and releases memory area that the file structure and mounting structure were allocated (storage area for file structure and mounting structure as copying source on RAM (S11*c*).

Therefore, the file structure and the mounting structure are saved without exception. Accordingly, file system information can be kept from before transitioning to power saving mode and after returning from power saving mode, since content of the file structure and the mounting structure can be restored by reinitializing process shown in FIG. 15 described later. Therefore, points shown in FIG. 3 can be satisfied.

It should be noted that, in addition to transitioning to power saving mode, this shutdown process is also executed when the secondary storage device 32 is dismounted from the main unit 2 and the main power is turned off by pressing the main power key of the information processing apparatus 1, and in such cases the general-purpose OS 23 determines "No", so the general-purpose OS 23 omits executing S11*b* and moves to S11*c*.

In FIG. 12, after finishing the shutdown process, the general-purpose OS 23 notifies the apparatus management module 241 that it is OK to transition to power saving mode (S12).

Figure 14:
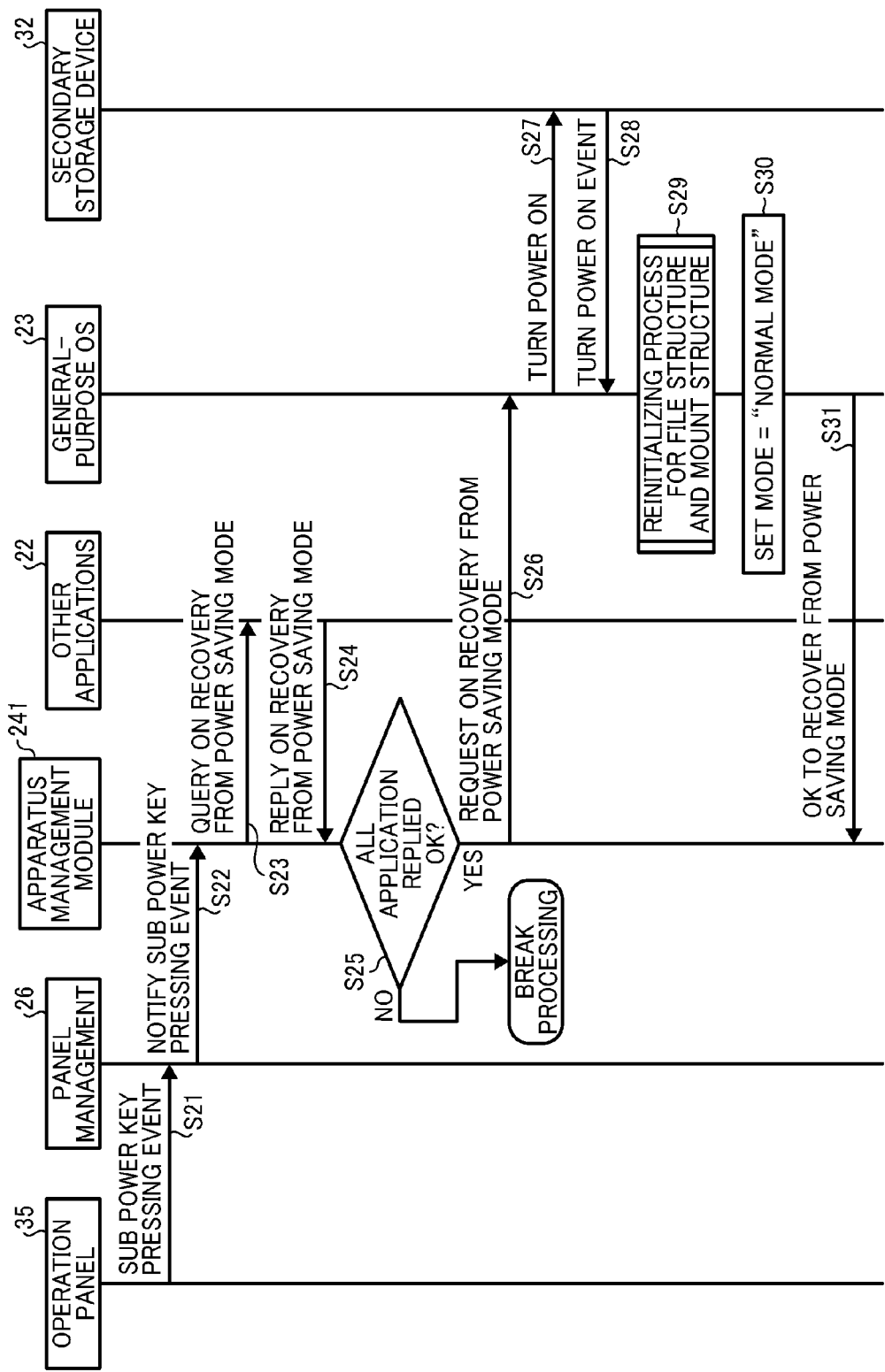
FIG. 14 is a diagram illustrating processing sequence in recovery from power saving mode of the information processing apparatus of the present invention.
Figure 15:
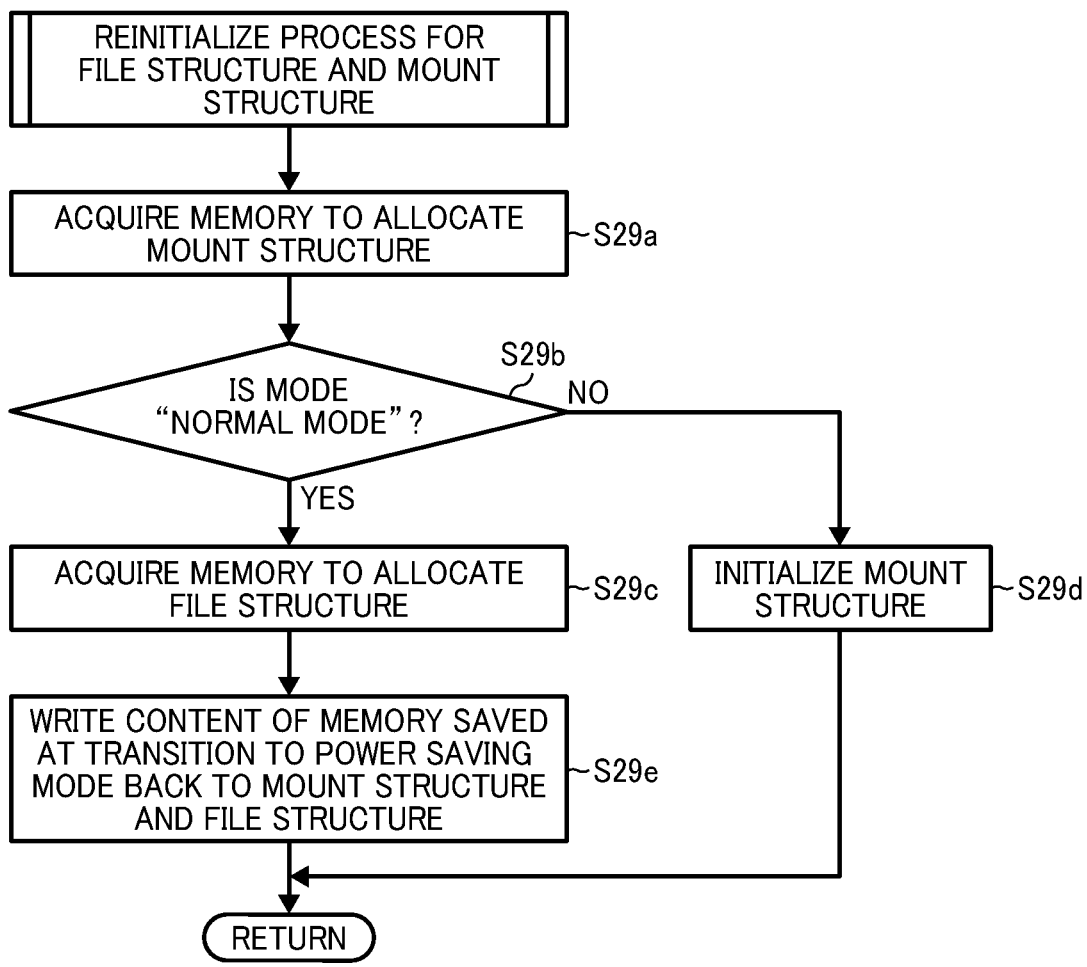
FIG. 15 is a flowchart illustrating the reinitializing process in FIG. 14 of the information processing apparatus of the present invention.

Next, processing sequence at returning from power saving mode in the information processing apparatus 1 will be described below referring to FIG. 14 and FIG. 15. FIG. 14 illustrates processing sequence at returning from power saving mode, and FIG. 15 is flowchart of reinitializing process in FIG. 14.

As shown in FIG. 14, when a user presses sub power key on the control panel 35, the control panel 35 notifies the panel management module 26 of sub power key pressing event (S21), and the panel management module 26 notifies the apparatus management module 241 of the sub power key pressing event (S22).

Next, the apparatus management module 241 asks other applications whether or not it is OK for each application to return from power saving mode using interprocess communication (S23), and receives responses (S24).

Only if all responses from applications are OK to return from power saving mode (S25: Yes) does the apparatus management module 241 request to return from power saving mode using system call published by the general-purpose OS 23 (S26). Besides (S25: No), the apparatus management module 241 quits processing.

After receiving the request to return from power saving mode, the general-purpose OS 23 executes processes such as updating values of predetermined registers in the secondary storage device 32, and turns the power of the secondary storage device 32 on (S27). When the secondary storage device 32 notifies the general-purpose OS 23 of power on event (S28), the general-purpose OS 23 reinitializes the file structure and the mounting structure (S29).

In this reinitializing process, the general-purpose OS 23 allocates memory to store the mounting structure on RAM (S29a), and determines whether or not it has already returned from power saving mode (S29b) as shown in FIG. 15.

In case of "Yes", the general-purpose OS 23 allocates memory to store the file structure (S29c), and writes information on the mounting structure and the file structure saved in memory at the time of transition to power saving mode in S11b back to memory allocated in S29c (S29e).

One example case of determining "Yes" in S29b is booting up of the apparatus, and in this case mounting structure is initialized (S29d). This process is described above referring to FIG. 9 and FIG. 10.

In FIG. 14, after finishing the reinitializing process, the general-purpose OS 23 notifies the apparatus management module 241 that it is OK to return from power saving mode after setting the power control mode to "normal mode" (S30, S31).

The apparatus management module 241 and other modules do not access the secondary storage device during power saving mode since they have loaded all of their own images to RAM for each executable file using RAM DISK method.

In FIG. 12, transitioning sequence to power saving mode is executed in response to pressing the sub power key on the control panel 35. When the control panel 35 is not operated for a certain period of time or no data is input from the network I/F 34 for a certain period of time, transitioning sequence to power saving mode is executed as well. Returning sequence from power saving mode is executed as well when the control panel 35 is operated or some data is input from the network I/F 34.

Also, although the description above assumes that the secondary storage device is the direct-mounted USB memory 32, cases in which the secondary storage device is the SD card 31 and the HDD 33 can be configured in the same way.

Additionally, in the embodiment described above, after copying the file structure and mounting structure, memory in which the source file structure and mounting structure were allocated is released (S11b, S11c in FIG. 13). This can be configured as keeping memory in which the file structure and mounting structure are allocated without copying the file structure and the mounting structure and releasing the memory. This is the configuration that does not execute the shutdown process at transition to power saving mode and the reinitializing process at return from power saving mode.

As described in detail above, the information processing apparatus 1 of the embodiment has the following seven advantages:

(1) The power of secondary storage device with large electric power consumption can be turned off in power saving mode. That can improve power saving effect considerably.

(2) The general-purpose OS 23 can execute the shutdown process promptly, since the general-purpose OS 23 can detect that the power of secondary storage device has been turned off by notifying that using interrupt or communication based on communicating protocol when the power is turned off.

(3) Usually, if a secondary storage device becomes unavailable at least temporarily due to power off or other reasons, file system information and information on files in the file system on the secondary storage device is once discarded. Accordingly, user programs need to execute mounting process and reopen files that the user programs opened previously when the power comes on again. By contrast, the information processing apparatus 1 in the above-described embodiment can return from power saving mode quickly, since it can keep information on files that the user programs opened and file system information until returning from power saving mode without discarding that information even if the device seemed to disappear from the viewpoint of the software after transitioning to power saving mode, and there is no need to execute the mounting process and opening process that are normally necessary again. Also construction of user programs can be simple because user programs do not need to execute the processes stated above again. That can also contribute to preventing defects in user programs.

(4) A module that synchronizes file caches on RAM with secondary storage device at fixed cycles to interface file cache stored inside the general-purpose OS 23 and secondary storage device exists in kernel. This module can be stopped in transition to power saving mode. Accordingly, that can prevent error related to hardware (bus error) caused by accessing the secondary storage device whose power is off, and can operate power saving mode stably.

(5) When a user program tries to access a secondary storage device whose power is off and not accessible after transition to power saving mode, the user program can be notified of an error. Accordingly, that can prevent error related to hardware caused by accessing secondary storage device whose power is off, and can operate power saving mode stably.

(6) File cache on RAM can be synchronized with the secondary storage device after it is available by resuming file cache synchronizing process after returning from power saving mode. That can prevent file corruption in the secondary storage device.

(7) User programs can access the secondary storage device after returning from power saving mode without reporting an error unless a particular problem occurs. Accordingly, state before transition to power saving mode can be kept.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application specific integrated circuits or by interconnecting an appropriate network of conventional component circuits, as will be readily apparent to those skilled in the relevant art.

What is claimed is:

1. An information processing apparatus connectable to a secondary storage device, comprising:
    a main storage device;
    an association unit configured to associate a file system in the main storage device with a file system in the secondary storage device in response to start-up of the information processing apparatus or connection of the secondary storage device to the information processing apparatus;
    a power control unit configured to turn power of the secondary storage device off in transition to a power saving mode;
    an information keeping unit configured to store the associated file system of the secondary storage device, in the main storage device; and
    a releasing unit configured to release an allocated storage area of the main storage device that stores the associated file system of the secondary storage device after the information keeping unit stores the associated file system of the secondary storage device.

2. The information processing apparatus according to claim 1, further comprising:
    an allocation unit configured to allocate the storage area to store the associated file system of the secondary storage device in the main storage device; and
    an information writing unit configured to write the stored file system of the secondary storage device to the allocated storage area.

3. The information processing apparatus according to claim 1, wherein
    the power control unit is configured to turn the power of the secondary storage device off when the information processing apparatus transitions to power saving mode, and
    the information keeping unit stores the associated file system in response to a notification of turning the power off from the secondary storage device after the secondary storage device shuts down.

4. The information processing apparatus according to claim 1, further comprising:
    a synchronizing unit configured to synchronize file cache data in the main storage device with the secondary storage device; and
    a stopping unit configured to stop the synchronizing process during power saving mode.

5. The information processing apparatus according to claim 1, further comprising;
    a reporting unit configured to report an error if a user program tries to access the secondary storage device in power saving mode.

6. A method of processing information on an information processing apparatus, the information processing apparatus including a main storage device and being connectable to a secondary storage device, the method comprising:
    associating a file system in the main storage device with a file system in the secondary storage device in response to start-up of the information processing apparatus or connection of the secondary storage device to the information processing apparatus;
    turning the power of the secondary storage device off in transition to a power saving mode;
    storing the associated file system of the secondary storage device, in the main storage device; and
    releasing an allocated storage area of the main storage device that stores the associated file system of the secondary storage device after the storing stores the associated file system of the secondary storage device.

7. The method of claim 6, further comprising:
    allocating the storage area to store the associated file system of the secondary storage device in the main storage device; and
    writing the stored file system of the secondary storage device to the allocated storage area.

8. A non-transitory computer-readable storage medium storing a program that, when executed by a computer, causes the computer to implement a method of processing information using an information processing apparatus, the information processing apparatus including a main storage device and being connectable to a secondary storage device and the method comprising:
    associating a file system in the main storage device with a file system in the secondary storage device in response to start-up of the information processing apparatus or connection of the secondary storage device to the information processing apparatus;
    turning the power of the secondary storage device off in transition to a power saving mode;
    storing the associated file system of the secondary storage device, in the main storage device; and
    releasing an allocated storage area of the main storage device that stores the associated file system of the secondary storage device after the storing stores the associated file system of the secondary storage device.

9. The non-transitory computer-readable storage medium of claim 8, wherein the method further comprises:
    allocating the storage area to store the associated file system of the secondary storage device in the main storage device; and
    writing the stored file system of the secondary storage device to the allocated storage area.

* * * * *